United States Patent [19]
Miyamoto

[11] Patent Number: 5,768,129
[45] Date of Patent: Jun. 16, 1998

[54] SYSTEM FOR ASSESSING IMPACT ON ENVIRONMENT DURING LIFE CYCLE OF PRODUCT

[75] Inventor: Shigeyuki Miyamoto, Tokyo, Japan

[73] Assignee: NEC Corporation, Tokyo, Japan

[21] Appl. No.: 669,946

[22] Filed: Jun. 25, 1996

[30] Foreign Application Priority Data

Jun. 30, 1995 [JP] Japan ................................ 7-165549

[51] Int. Cl.$^6$ .................................................. G06F 19/00
[52] U.S. Cl. ...................... 364/420; 345/335; 345/336; 364/400
[58] Field of Search ........................ 364/400, 420, 364/550, 551.01; 395/201, 335, 336, 338, 352; 345/335, 336, 338, 352; 705/1

[56] References Cited

U.S. PATENT DOCUMENTS 5,652,708  7/1997  Miyamoto et al. ................ 364/468.13

*Primary Examiner*—Edward R. Cosimano
*Attorney, Agent, or Firm*—Sughrue, Mion, Zinn, Macpeak & Seas, PLLC

[57] ABSTRACT

The environmental assessment system is used for assessing impacts to environment during a life cycle of a product from its production up to its disposal, and includes an input section, an input help section, a data storing section, an environmental impact assessment section and a display section. The input section inputs text information and image information relating to respective processes of the product, information relating to inter-relationships between respective processes, factors for environmental impacts, and environmental impact values. The input help section stores information necessary for helping data input at the input section and displays the stored data according to instructions from the input section. The data storing section stores the information inputted through the input section for each of the processes. The environmental impact assessment section calculates a total environmental impact of the product, and the display section displays information such as the total environmental impact values. The input help section includes an image information storing section to show content of each process in images.

10 Claims, 3 Drawing Sheets

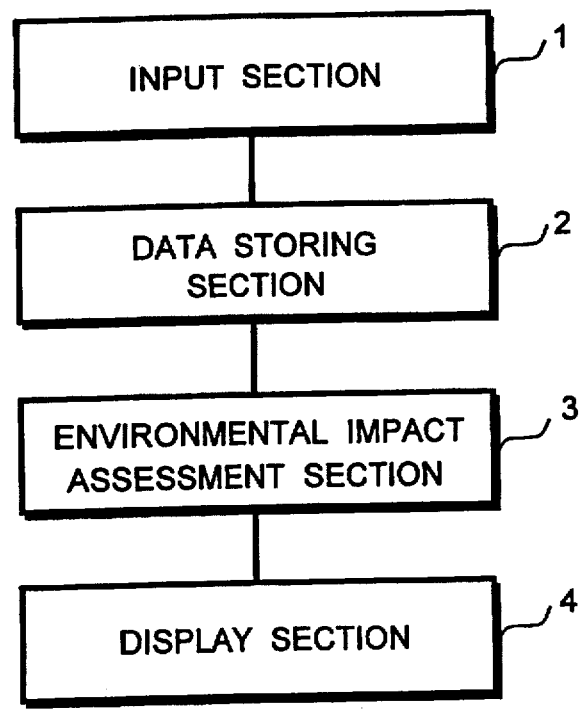

SYSTEM FOR ASSESSING IMPACT ON ENVIRONMENT DURING LIFE CYCLE OF PRODUCT

BACKGROUND OF THE INVENTION

(1) Field of the Invention

The present invention relates to a system for life cycle assessment, that is, a system for assessing impact on overall environment during a life cycle of a product from its manufacture to its disposal.

(2) Description of the Related Art

A conventional system for assessing the total environmental impacts during the life cycle of a product is first explained to assist the understanding of the present invention. In the conventional system as shown in FIG. 1, the life cycle of a product from its manufacture through to its disposal is divided into a plurality of processes which are expressed as inter-related processes, values of the environmental impact factors for the respective processes are calculated, and the calculated values are added up to draw the total environmental impact values of the product.

The system shown in FIG. 1 includes an input section 1, a data storing section 2, an environmental assessment section 3, and a display section 4. At the input section 1, the input is made of text information relating to the contents of each process, information relating to inter-relationships between respective processes, and information on factors of environmental impacts that occur in each process. The data storing section 2 stores for each process a set of the text information relating to the contents of the respective processes that are inputted through the input section 1, the information relating to the relationships between the respective processes, the information on the factors of the environmental impacts that arise between the respective processes, and the environmental impact values at the respective environmental factors. The environmental assessment section 3 calculates the total environmental impacts of the product with the calculation being based on the interrelationships between the respective processes stored in the data storing section 2 and using the environmental impact values that occur in each of the processes. The display section 4 displays the text information relating to the contents of each process, the information relating to the inter-relationships between the respective processes, and the total environmental impact values of the product that are calculates at the environmental impact assessment section 3.

For executing the environmental impact assessment of a product by using the environmental impact assessment system shown in FIG. 1, it is necessary that, for inputting the environmental impact value, each process be considered having its own independent characteristics. However, in such a conventional environmental impact assessment system, each process is identified by text information using only, for example, the name of the process without information as to, for example, the shape of the product or components thereof. Thus, the user of the system sometimes encounters difficulties in making distinctions among similar processes. In such a case, when inputting the environmental impact values obtained in respective processes, the user tends to make errors by inputting them for processes having different objects, or is required to carry out additional work for confirming the contents of the process.

Particularly, the products in electronic and precision machinery fields are made up of large number of parts so that, when the manufacturing processes of such parts are taken into consideration, the number of the entire processes involved in the manufacturing are enormous. For executing the environmental impact assessment of such products, if the user is to rely only on text information, the proper identification and understanding of the numerous processes is difficult and the environmental impact assessment is extremely inefficient.

Further, for inputting the environmental impact values, it is essential for the user of the environmental impact assessment system to have correct understanding of the meaning of each factor of the environmental impacts. However, the conventional system does not include functions to provide help in this respect. Thus, if the user lacks the proper understanding of the environmental impact factors, he may make an input of incorrect environmental impact values or he may need to resort to other means and spend extra time for confirming the meaning of environmental impact factors, thus making the assessment work inefficient.

In order to increase the accuracy in the execution of the environmental impact assessment, it becomes necessary for the user to handle a larger number of environmental impact factors, and this makes it difficult to understand the correct meaning of all of the enormous number of such impact factors, resulting in an inefficient impact assessment.

SUMMARY OF THE INVENTION

An object of the invention, therefore, is to overcome the problem existing in the prior art, and to provide an environmental impact assessment system with which the total impact assessment of a product from its manufacture until the disposal thereof can be carried out efficiently.

According to one aspect of the invention, there is provided an environmental assessment system for assessing impacts to environment during a life cycle of a product from its production up to its disposal, the system comprising:

- an input section which inputs text information relating to contents of each of processes representing the life cycle as a plurality of inter-related processes, information relating to inter-relationships between respective processes, factors for environmental impacts arising in each process, and environmental impact values in the factors for environmental impacts;

- an input help section which stores information necessary for helping data input at the input section and displays the stored data according to instructions from the input section;

- a data storing section which stores the text information relating to the contents of each of the processes inputted to the input section, the information relating to interrelationships between the respective processes, the factors for environmental impacts arising in each process, and the environmental impact values in the factors for environmental impacts;

- an environmental impact assessment section which calculates, based on the inter-relationships between the respective processes stored in the data storing section, and a total environmental impact value of the product by using the environmental impact values obtained in each process; and

- a display section which indicates the text information relating to the contents of each of the processes, the information relating to the inter-relationships between the respective processes, and the total environmental impact value of the product that is calculated by the environmental impact assessment section.

The environmental impact assessment system according to the invention includes, in addition to sections in the prior art environmental impact assessment system, an image information storing section which stores information in an image form concerning the contents of each process so that, where necessary, the user of the system may extract the image information concerning the contents of each process through the display section. In this way, the user may easily and correctly understand each process. Thus, for inputting the environmental impact values arising from each process, it is possible to prevent the information from being inputted for unintended processes, and also possible to make it unnecessary to confirm the contents of the process by a separate means, thus enhancing the efficiency in the environmental impact assessment.

The advantageous effects achieved by the system according to the invention are especially remarkable when it is applied to electronic and precision machinery products which are made up of a very large number of parts and are made through a large number of processes.

Also, the effects are remarkable especially when the user of the system is required to handle a large number of environmental impact assessment factors in order to enhance the accuracy of the assessment.

BRIEF DESCRIPTION OF THE DRAWINGS

The above and other objects, features and advantages of the present invention will be apparent from the following description of preferred embodiments of the invention explained with reference to the accompanying drawings, in which:

FIG. 1 is a block diagram showing a prior art environmental impact assessment system;

FIG. 3 is a block diagram for use in explaining one form of information stored at a data storing section in the environmental impact assessment system of a first embodiment according to the invention.

PREFERRED EMBODIMENTS OF THE INVENTION

Figure 2A:
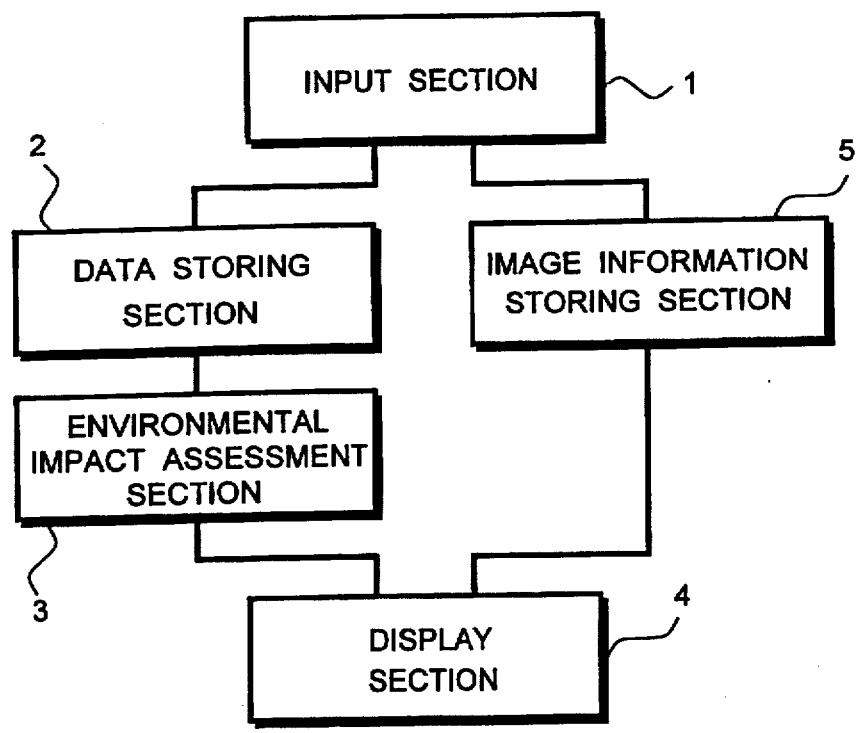
FIG. 2A is a block diagram showing an environmental impact assessment system of a first embodiment according to the invention.

An environmental impact assessment according to the invention includes, as basic components, an input section, an input help section, a data storing section, an environmental impact assessment section and a display section. This system allows the assessment of the total environmental impacts throughout a life cycle of a product from the manufacture to the disposal thereof.

Now, the function of each of the main elements is explained. The input section is a section at which, with respect to a plurality of inter-related processes for the life cycle of a product, the input is made of text information relating to the contents of each process, information relating to the inter-relationships between respective processes, environmental impact factors arising in each of the processes, and environmental impact values obtained at the respective environmental impact factors.

The input help section stores the information necessary for helping the inputting of data at the input section, and the data thus stored is displayed on the screen of the display section according to the instructions from the data input section.

The data storing section stores, on an individual process basis, a set of the text information relating to the contents of each process that are inputted from the input section, the information relating to the inter-relationships between respective processes, the environmental impact factors arising between the respective factors, and the environmental impact values obtained for the respective environmental impact factors.

The environmental impact assessment section calculates, based on the inter-relationships between the respective processes stored in the data storing section, the total environmental impacts of the product by using the environmental impact values obtained in each process.

Also, the display section indicates text information relating to the contents of each process, information relating to the inter-relationships between the respective processes, and the total environmental impact values of the product that are calculated by the environmental impact assessment section.

Now, specific embodiments of the invention are explained. In a first embodiment illustrated in FIG. 2A, the input help section is constituted by an image information storing section 5. The system shown in FIG. 2A comprises an input section 1, a data storing section 2, an environmental impact assessment section 3, a display section 4 and an image information storing section 5.

The input section 1 is used for inputting text information relating to the contents of each section, image information relating to the contents of each process, environmental impact factors arising in each process, and environmental impact values of each of the environmental impact factors. The image information storing section 5 stores the image information inputted from the input section 1.

The data storing section 2 stores the data other than the image information inputted from the input section 1 and the pointer information of the image information storing section 5. The environmental impact assessment section 3 adds up the environmental impact values in the respective processes and calculates the total environmental impact values based on the inter-relationships between the respective processes. The display section 4 displays the data inputted at the input section 1 and the calculated total environmental impact values.

Figure 2B:
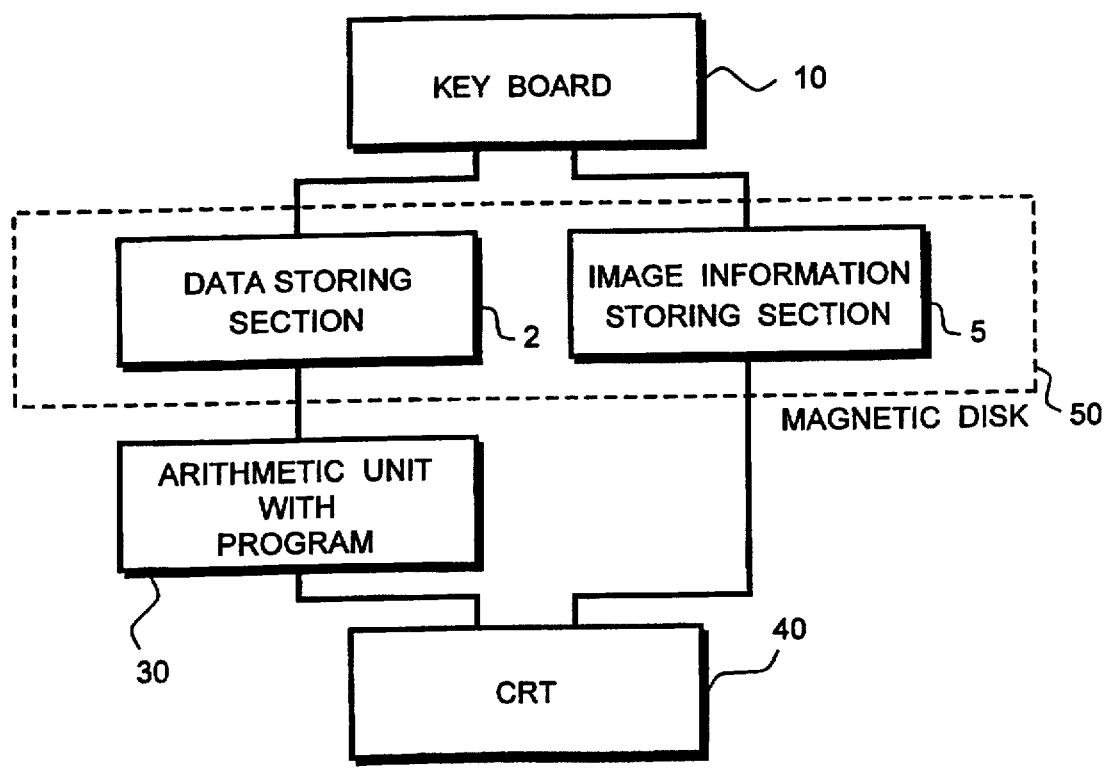
FIG. 2B is a block diagram showing a specific example of an environmental impact assessment system of a first embodiment according to the invention.

The environmental impact assessment system of the first embodiment according to the invention can be constructed as a computer system equipped with an environmental impact assessment program, as shown in FIG. 2B. In this case, the input section 1 may take the form of an input device such as a keyboard 10 and a mouse, and the image information storing section 5 and the data storing section 2 may be memory devices such as a magnetic disk 50 and a magneto-optic disk. The environmental impact assessment section 3 may be an arithmetic unit equipped with an environmental impact program 30, and the display section 4 is an output device such as a CRT 40. The data image-displayed at the display section 4 can be outputted to an output device such as a printer.

FIG. 3 is for use in explaining one form of information stored at the data storing section in the environmental impact assessment system of the first embodiment according to the invention. The information stored here includes a name of one process, a piece of text information for one process, a piece of pointer information for one process image information, a plurality (m number) of associated process names, a plurality (n number) of environmental impact factors, and a plurality (n number) of environmental impact values. When a request for the display of image information of a given process is made, the data storing section 2 first makes a search for the process whereby corresponding pointer information is provided. Then, this pointer information is searched at the image information storing section 5 whereby the corresponding image information is accessed, and is displayed at the display section 4.

In the case of, for example, a manufacturing process of a product, the text information relating to the contents of the process covers the number of components and units manufactured, weights and volumes, sources of environmental impact data, and names of persons preparing the data. Also, in the case of, for example, a manufacturing process of a component, the image information relating to the process covers still images of shapes of the component manufactured, and may also cover movie images, with accompanying sound, concerning the manufacturing states of the component.

In this environmental impact assessment system, if the form of the image data stored at the image information storing section 5 is limited to still images or movie images with sound, it becomes unnecessary for the data storing section 2 to store the information relating to the forms of the image information. Thus, the advantage gained is that the required capacity of the data storing section 2 can be reduced.

Also, if the form of the image information stored at the image information storing section 5 is limited to the still images, since the required capacity is less than that for the movie images, the required capacity of the image information storing section 5 can be reduced. Further, since the computing capability that is required in the movie image indication is not required so that the manufacturing cost can be reduced.

Figure 4:
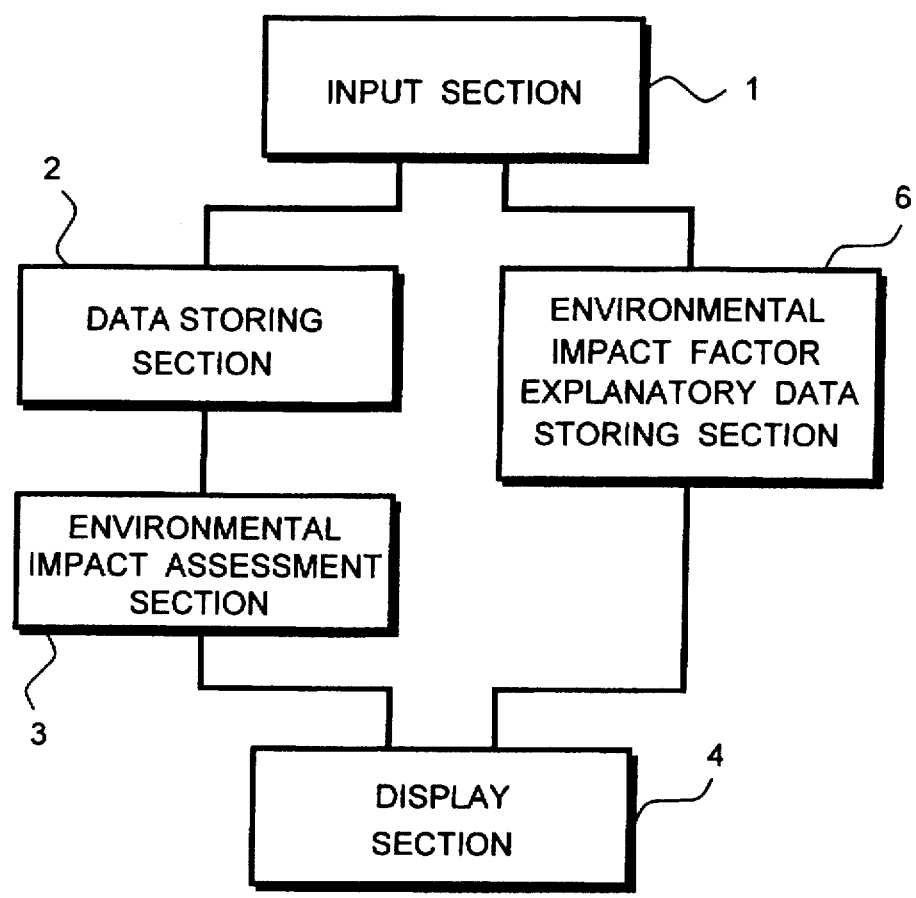
FIG. 4 is a block diagram showing an environmental impact assessment system of a second embodiment according to the invention.

FIG. 4 is a block diagram showing the structure of an environmental impact assessment system of a second embodiment according to the invention. In this embodiment, the input help section is constituted by an environmental impact factor explanatory data storing section 6.

The system shown in FIG. 4 includes the input section 1, the data storing section 2, the environmental impact assessment section 3, the display section 4, and the environmental impact factor explanatory data storing section 6.

The input section 1 receives inputs of information relating to the contents of each process, environmental impact values of each environmental impact factor, and an explanatory data for environmental impact factors. The data storing section 2 stores data other than the explanatory data for the environmental impact factors inputted from the input section 1.

The environmental impact factor explanatory data storing 6 stores an environmental impact factor explanatory data. The environmental impact assessment section 3 provides the total environmental impact values of the product by adding up the environmental impact values of the respective processes based on the inter-relationships between the respective processes. The display section 4 displays the data inputted at the input section 1 and the calculated total environmental impact values.

The environmental impact factor explanatory data storing section 6 stores the environmental impact factors and their explanatory data for the environmental impact factors as sets. When a request is made from the input section 1 for the display of the explanatory data of any environmental impact factor, this explanatory data is searched at the environmental impact factor explanatory data storing section 6 whereby the corresponding explanatory data is accessed and is displayed at the display section 4.

It is to be noted that the input help section may be constituted by combining the image information storing section 5 shown in FIG. 2A and the environmental impact factor explanatory data storing section 6 shown in FIG. 4.

According to the invention, since the user of the environmental impact system can easily understand the contents of each process, it is possible to solve the problem caused by a lack of the understanding of such contents, and this enables the enhancement of the efficiency of the environmental impact assessment. The advantage achieved is especially remarkable in executing the environmental impact assessment of products such as electronic devices or precision machines and their parts.

Also, since the user of the environmental impact system can carry out the work in a state in which he has full understanding of the contents of the environmental impact factors, it is possible to solve the problem that may otherwise be caused by a lack of the understanding of the contents of the environmental impact factors, and this enables the enhancement of the environmental impact assessment. Especially since the environmental impact assessment can be carried out more accurately, the effects are more remarkable in cases where a large number of environmental impact factors must be handled.

Further, where the image information and the explanatory data of the environmental impact factors are combined, the environmental impact assessment can be further enhanced.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An environmental assessment system for assessing impacts to environment during a life cycle of a product from its production up to its disposal, said system comprising:

an input section which inputs text information relating to contents of each of processes representing said life cycle as a plurality of inter-related processes, information relating to inter-relationships between respective processes, factors for environmental impacts arising in each process, and environmental impact values in said factors for environmental impacts;

an input help section which stores information necessary for helping data input at said input section and displays the stored data according to instructions from said input section;

a data storing section which stores said text information relating to the contents of each of the processes inputted to said input section, said information relating to inter-relationships between said respective processes, said factors for environmental impacts arising in each process, and said environmental impact values in said factors for environmental impacts;

an environmental impact assessment section which calculates, based on said inter-relationships between the respective processes stored in said data storing section, and a total environmental impact value of said product by using said environmental impact values obtained in each process; and a display section which indicates said text information relating to said contents of each of the processes, said information relating to said inter-relationships between the respective processes, and said total environmental impact value of the product that is calculated by said environmental impact assessment section.

2. A computer system as in claim 1 wherein the input help section displays help when required by the user.

3. An environmental assessment system for assessing impacts to environment during a life cycle of a product according to claim 1, in which said input help section comprises an image information storing section which stores image information to show the contents of each process, said data storing section storing pointer information for said image information.

4. An environmental assessment system for assessing impacts to environment during a life cycle of a product according to claim 3, in which said image information stored at said image information storing section is a still image.

5. An environmental assessment system for assessing impacts to environment during a life cycle of a product according to claim 1, in which said input help section comprises an environmental impact factor explanatory data storing section which stores information relating to explanations of environmental impact factors to be inputted to said input section.

6. An environmental assessment system for assessing impacts to environment during a life cycle of a product according to claim 5, in which said image information stored at said image information storing section is a movie image with sound.

7. An environmental assessment system for assessing impacts to environment during a life cycle of a product according to claim 1, in which said input help section is in combination of an image information storing section that stores image information to show the contents of each process and an environmental impact factor explanatory data storing section that stores information relating to explanations of environmental impact factors to be inputted to said input section.

8. An environmental assessment system for assessing impacts to environment during a life cycle of a product according to claim 7, in which said image information stored at said image information storing section is a still image.

9. An environmental assessment system for assessing impacts to environment during a life cycle of a product according to claim 7, in which said image information stored at said image information storing section is a movie image with sound.

10. A method for assessing environmental impact of manufacture and disposal of a product using a computer system comprising an input section, an input help section, a data storing section, an environmental impact assessment section and a display section; the method comprising:

(a) inputting text information relating to contents of each of the processes representing the life cycle of a product;

(b) inputting text information relating to the relationships between the processes;

(c) inputting factors for environmental impact from each of the processes;

(d) inputting values for the factors;

(e) displaying help from the input help section while performing steps (a)–(d), if help is requested;

(f) storing the data input in steps (a)–(d) into the data storing section;

(g) calculating environmental impact assessment value for each of the processes using data stored in the data storing section, based on the relationships between the processes;

(h) calculating total environmental impact value of the product from the environmental impact assessment values calculated in step (g);

(i) displaying the total environmental impact value, textual information for the processes and textual information for the relationships between the processes.

* * * * *